(12) United States Patent
Mächler

(10) Patent No.: US 12,367,245 B2
(45) Date of Patent: Jul. 22, 2025

(54) METHOD AND COMPUTER BASED DATA PROCESSING SYSTEM FOR INFORMATION RETRIEVAL AND PRESENTATION

(71) Applicant: YONDER AG, Zürich (CH)

(72) Inventor: Christoph Mächler, Zürich (CH)

(73) Assignee: YONDER AG, Zürich (CH)

( * ) Notice: Subject to any disclaimer, the term of this patent is extended or adjusted under 35 U.S.C. 154(b) by 245 days.

(21) Appl. No.: 17/919,764

(22) PCT Filed: Apr. 27, 2021

(86) PCT No.: PCT/EP2021/060890
§ 371 (c)(1),
(2) Date: Oct. 19, 2022

(87) PCT Pub. No.: WO2021/224052
PCT Pub. Date: Nov. 11, 2021

(65) Prior Publication Data
US 2023/0195804 A1    Jun. 22, 2023

(30) Foreign Application Priority Data
May 5, 2020    (CH) ..................... 00534/20

(51) Int. Cl.
*G06F 17/00* (2019.01)
*G06F 16/93* (2019.01)
*G06F 40/106* (2020.01)
*G06F 40/197* (2020.01)

(52) U.S. Cl.
CPC ............ *G06F 16/93* (2019.01); *G06F 40/106* (2020.01); *G06F 40/197* (2020.01)

(58) Field of Classification Search
CPC ...... G06F 16/93; G06F 40/197; G06F 40/106; H04L 51/52; H04L 63/1433; H04L 63/1408; H04L 67/306; H04L 67/025; H04L 41/22
USPC .......................................... 715/209
See application file for complete search history.

(56) References Cited

U.S. PATENT DOCUMENTS

| | | |
|---|---|---|
| 9,852,117 B1 | 12/2017 | Leschner |
| 2004/0030726 A1 | 2/2004 | Baxter |
| 2004/0133544 A1 | 7/2004 | Kiessig et al. |
| 2009/0024747 A1* | 1/2009 | Moses .................. H04L 67/025 709/228 |

(Continued)

*Primary Examiner* — Jason T Edwards
(74) *Attorney, Agent, or Firm* — Rankin, Hill & Clark LLP

(57) ABSTRACT

In a method for information retrieval and presentation, units of information are represented by modules including a module content and module metadata. Relations between modules are represented by links, with link attributes being a source module ID, identifying a source module in which the link is referenced, and a target module ID. Further attributes define a trigger type specifying an event causing a trigger to be activated, and a trigger action specifying an action to be taken when the trigger is activated. A trigger dataset represents a target module and version to which the link refers, and an effective to date and effective from date define a time window in which this target module version is effective. The method includes the steps of determining, based on the trigger dataset, whether an event defined by the trigger type has occurred, and triggering the associated trigger action.

13 Claims, 4 Drawing Sheets

(56) References Cited

U.S. PATENT DOCUMENTS

| | | | |
|---|---|---|---|
| 2014/0222493 A1* | 8/2014 | Mohan | G06Q 10/06316 |
| | | | 705/7.26 |
| 2016/0301708 A1* | 10/2016 | Grondin | H04L 51/52 |
| 2017/0344526 A1 | 11/2017 | Smith et al. | |
| 2019/0325056 A1* | 10/2019 | Sloane | G06F 16/248 |
| 2021/0357927 A1* | 11/2021 | Kita | G06Q 20/38215 |

* cited by examiner

METHOD AND COMPUTER BASED DATA PROCESSING SYSTEM FOR INFORMATION RETRIEVAL AND PRESENTATION

BACKGROUND OF THE INVENTION

Field of the Invention

The invention relates to the field of dynamic generation of human-readable virtual documents, and relates to a method and a computer based data processing system for information retrieval and presentation.

Description of Related Art

US 2004/0030726 shows a content management system for dynamically generating websites based on format and organisation (such as outline) information. Information being displayed is personalised according to a user identity. Content is associated with triggers, a trigger being a circumstance, which occurs that initiates either an automated or a non-automated review of components, more particularly, a review of content.

US 2004/133544 describes a file management system that organizes files based on metadata related to each file. The file management system allows actions to occur automatically based on predetermined events, including changes in metadata. The file management system includes mechanisms for causing side effects to normal file system operations. These mechanisms are referred to as triggers. They can be based on events such as the closing, moving, e-mailing . . . of a file. Actions triggered can include a review or sign-off by a user. In combination, triggers can be used to define workflows.

U.S. Pat. No. 9,852,117 shows a text-fragment based content editing and publishing, in which a text-fragment is created in response to a trigger event received by an editor from a user interface. A publishable output is generated in response to the text-fragments in the text file and a selected theme defining the appearance of one or more Web pages within the publishable output. Metadata in individual text-fragments may include versioning labels and other information. Output generated can be so-called "draft output", controlled by including text fragments that have a "draft" or "update" label and presenting the output to a user for review.

US 2017/344526 discloses a document architecture system that can receive raw data streamed from external data source(s), analyse the raw data to identify triggering events, apply rules to the triggering events identified, break down the raw data accordingly, and generating messages in an internal for-mat to represent the pieces of data without any formatting or layout information. The messages can be augmented with custom metadata and stored as fragments that reference, but that do not physically incorporate, the messages. The stored fragments can be used by the document process engine to intelligently render documents and versions thereof. This is done by a document architecture (DA) that utilizes document fragments to construct documents of different versions. Versions can correspond to different software (e.g. content server), platform-specific versions, user-based role versions, different contextual versions, etc.

There is a need for improvement of change management in information systems in which information is combined from multiple sources or modules.

SUMMARY OF THE INVENTION

It is therefore an object of the invention to create a method and a computer based data processing system for information retrieval and presentation of the type mentioned initially, which provides an improvement of change management when compared to the prior art.

The method for information retrieval and presentation is performed by a computer-based data processing system. Therein, units of information are represented by modules, each module including a module content and module metadata, the module content representing textual information and the module metadata controlling the retrieval and presentation of the module content, Relations between modules are represented by links, links being associated with link attributes, and link attributes of each link including at least the following attributes:
- a source module ID, identifying a source module in which the link is referenced;
- a target module ID, identifying a target module to which the link refers;
  - optionally a target module document context identifying a context in which to present the module content of the target module;
  - optionally a target module version;
- information defining a trigger type and an associated trigger action, the trigger type specifying an event causing a trigger to be activated, and the trigger action specifying an action to be taken when the trigger is activated;
- a link status, indicating at least an availability of the target module;
- a trigger dataset, representing a target module and version to which the link refers, and an effective to date and effective from date defining a time window in which this target module version is effective.

This allows to implement change management in a way that keeps distributed but linked information up to date and consistent.

In embodiments, the method includes the steps of:
determining, based on the trigger dataset, whether an event defined by the trigger type has occurred, and triggering the associated trigger action.

In other embodiments, the method includes one or more of the steps described below, without the above step, or in combination with it.

In embodiments, the trigger type specifies one of the following events:
the version of the target module to which the link refers getting a new module effective to date;
the module effective from date of the version of the target module to which the link refers being equal to the current date.

The current date is the date at which the method is executed.

In embodiments, a trigger action specifies one of:
informing a user about a change in the version of the target module to which the link refers, in particular wherein the user to be notified is identified by a predefined set of user groups associated with the link;
initiating a change request associated with the source module in which the link is referenced.

In embodiments, the availability of a target module is one of the following:
the target module is available;
the target module is missing;
a specified version of the target module is not available;
and optionally of the following:
a specified version of the target module is not available, and a user must select from a list of available versions.

In embodiments, the method includes the steps of:
  at regular time intervals, in a batch process, for each link, determining the availability of its target module and storing this availability as part of the link status;
    and determining, if the target module is available, an available target module version and storing the target module version as an attribute of the link;
  when a document including the link is presented to a user, determining, based the on availability of its target module and a user identity and/or filtering criteria, whether the link and/or module content of the target module is presented to the user.

In embodiments, the link attributes include:
  an external ID, identifying an external target module stored in an external server system, wherein the module content of the target module to which the link refers the is a copy of an original module content of the external target module.
and the method includes the step of:
  if content associated with the link is to be presented to the user, retrieving and presenting the original module content from the external target module, in particular in a context of the external target module.

In embodiments, the link attributes include:
  information defining display options, specifying how to display the module content of the target module, and a description of the link; in particular wherein the display options include one or more of:
    displaying the module content of the target module within the module content of the source module;
    displaying the description as hyperlink within the module content of the source module;
    displaying the description in a reference section associated with the module content of the source module;
    displaying the description only to users with associated privileges;
and the method includes the step of:
  displaying the module content of the target module according to the information defining display options.

In embodiments, only a single display option is implemented and thus does not need to be specified. This will typically be displaying the module content of the target module within the module content of the source module.

In embodiments, the target module document context specifies whether to present the module content of the target module within a document as part of which the source module is being presented, or as part of a home document of which the target module is part;
  and the method includes the step of presenting the module content according to the target module document context.

In embodiments, the link attributes of a link are stored as part of a data object representing the link.

In a computer based data processing system for information retrieval and presentation, units of information are represented by modules, each module including a module content and module metadata, the module content representing textual information and the module metadata controlling the retrieval and presentation of the module content. Relations between modules are represented by links, links being associated with link attributes, and link attributes of each link including at least the following attributes:
  a source module ID, identifying a source module in which the link is referenced;
  a target module ID, identifying a target module to which the link refers;
  optionally a target module document context identifying a context in which to present the module content of the target module;
  optionally a target module version;
  information defining a trigger type and an associated trigger action, the trigger type specifying an event causing a trigger to be activated, and the trigger action specifying an action to be taken when the trigger is activated;
  a link status, indicating at least an availability of the target module;
  a trigger dataset, representing a target module and version to which the link refers, and an effective to date and effective from date defining a time window in which this target module version is effective.

A data processing system for information retrieval and presentation, includes a provider server computer system, and optionally a client device, the data processing system being programmed to perform the method according to the method presented herein.

A non-transitory computer readable medium includes computer readable program code encoding a computer program that, when loaded and executed on a computer, causes the computer to perform the method according to the method presented herein.

A reproducible computer-readable signal encodes the computer program that, when loaded and executed on a computer, causes the computer to perform the method according to the method presented herein.

A method of manufacturing a non-transitory computer readable medium, includes the step of storing, on the computer readable medium, computer-executable instructions which when executed by one or more processors of a computing system, cause the computing system to perform the method according to the method presented herein.

In an embodiment, a computer program product for information retrieval and presentation is loadable into an internal memory of a digital computer or a computer system, and includes computer-executable instructions to cause one or more processors of the computer or computer system execute the method for information retrieval and presentation. In another embodiment, the computer program product includes a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical or functionally identical entities are provided with the same reference symbols in the figures.

Figure 1:
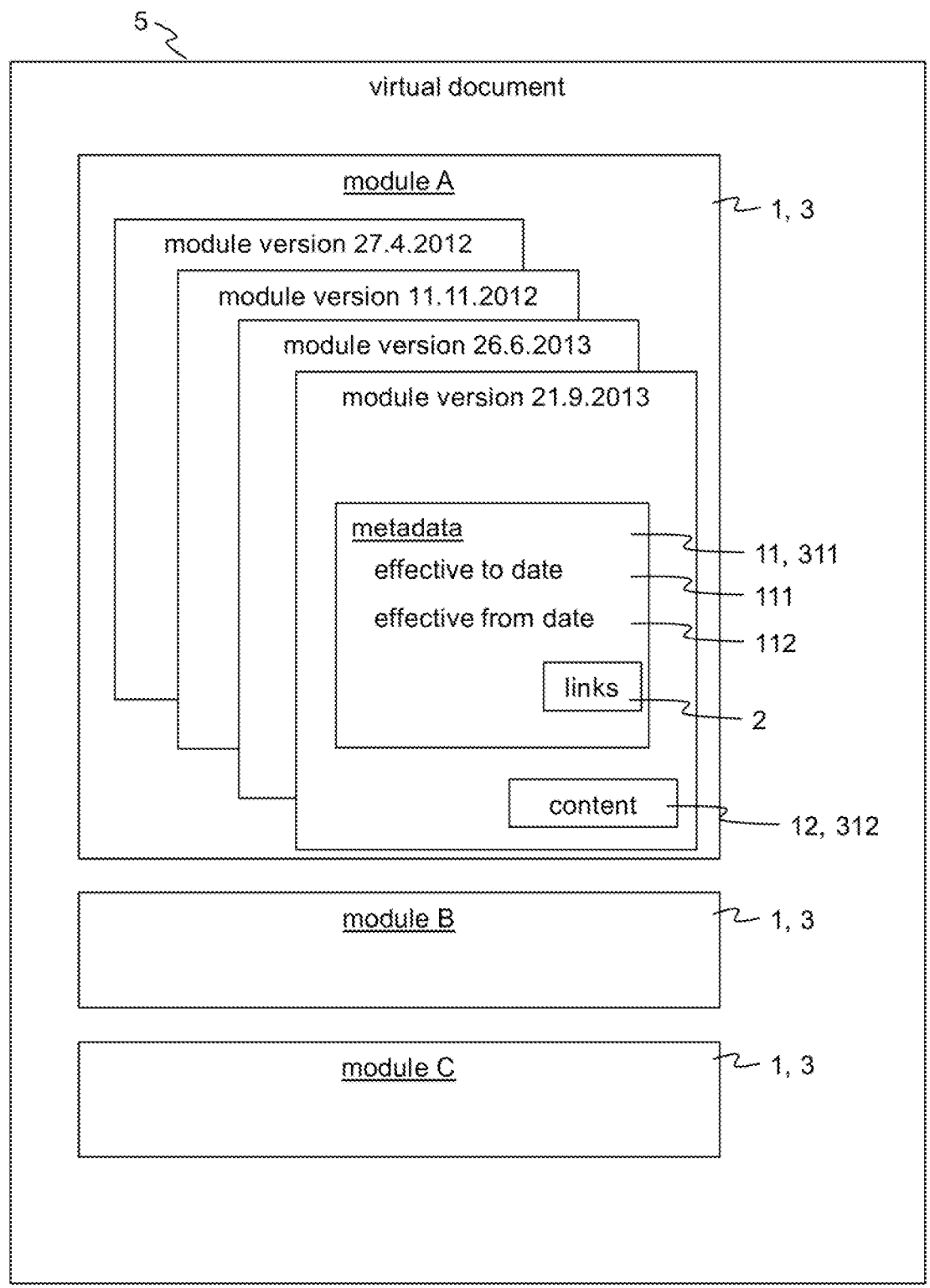
FIG. 1 elements of a virtual document.

FIG. 1 shows elements of a virtual document. The virtual document 5 includes a number of modules 1, 3. Each module 1, 3 includes module content 12 such as text, images, and other media, and module metadata 11 that describes the module content 12. The module metadata 11 can include one or more links 2 referencing other modules. The module metadata 11 further can include content related and other tags and access control information, which allow to filter the modules according to content and the role of a user accessing the document 5. When displaying the virtual document 5 to a user, the visibility of modules 1, 3 is controlled according to such information.

Displaying a module 1, 3 includes displaying its module content 12, and information referenced by the links 2. This information can be, for example, a description 23 of link 2, or the module content of a modules 1, 3 referenced by the link 2. In this way, the content of the virtual document 5 can be assembled as a combination of content from modules 1, 3 from different sources. Each module 1, 3 has a home document 5 in which the module 1, 3 is maintained and updated by a module owner, who typically is the home document 5 owner. All other documents 5 that reference the module 1, 3 retrieve the module 1, 3 when it is required for displaying to a user. In embodiments, the content of the module can be cached for off-line viewing.

A module 1, 3 usually exists in a plurality of module versions. Version information is expressed as part of the module metadata 11 in the form of:
- a module effective to date 111, specifying up to which date the information in the module is effective or valid; and
- a module effective from date 112, specifying from which date on the information is effective.

In embodiments, the module metadata 11 includes a visibility from date, specifying from which date on the module is visible to users. This visibility from date can be before the effective from date 112.

In view of ongoing changes to modules 1, 3 in separate home documents 5 and corresponding module versions referenced by other virtual documents it is necessary to maintain consistency of the information each particular document 5.

A system of links with associated attributes and methods serves to drive the retrieval and presentation of information, in particular module content 12, and also an update process for triggering changes in module versions depending on their dependencies.

Figure 2:
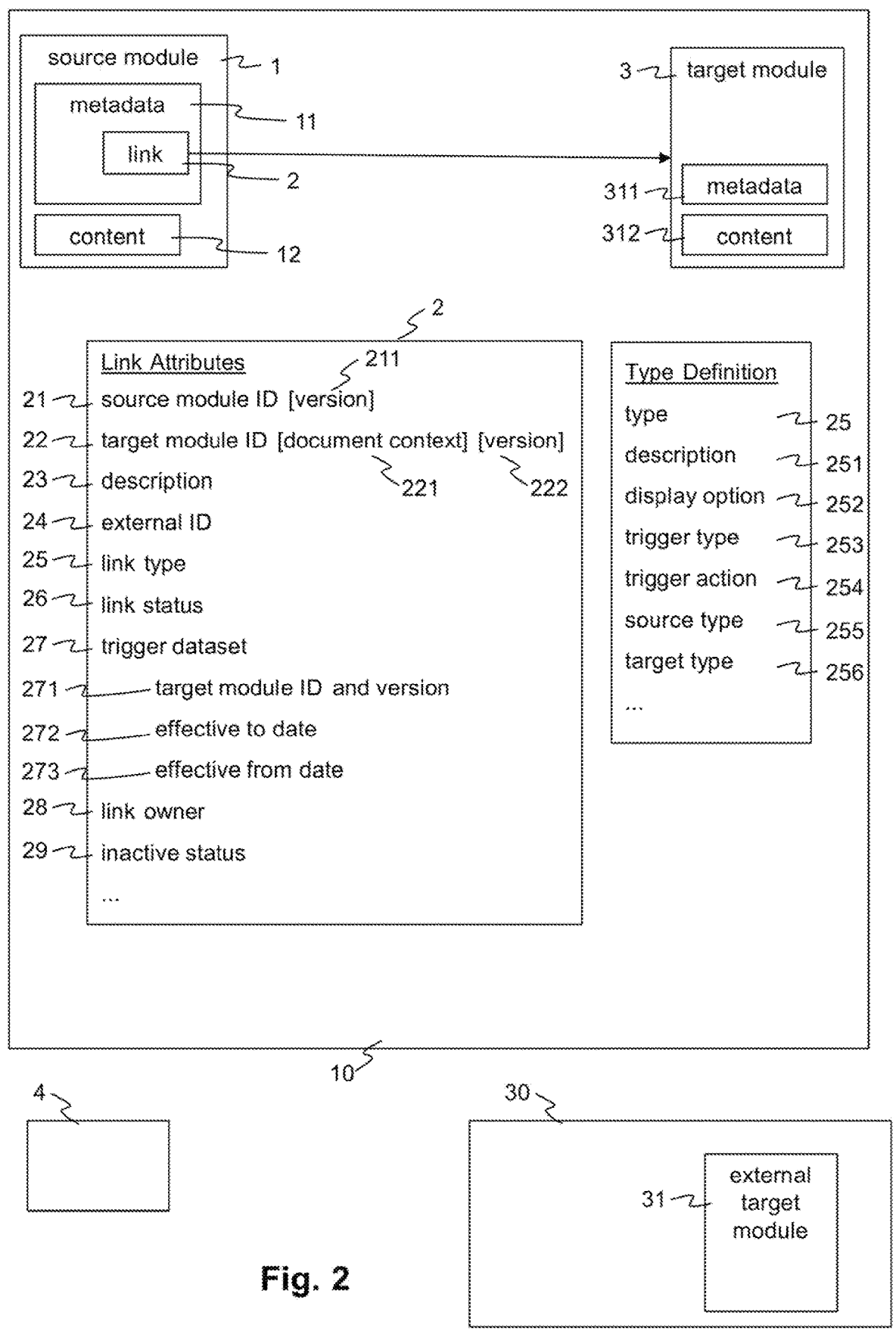
FIG. 2 software entities of the information retrieval and presentation system.

FIG. 2 schematically shows software entities of the information retrieval and presentation system. These entities are maintained in a provider server system 10 such as a single server computer or a cluster of distributed server computers. Virtual documents 5 can be presented to a user of the provider server system 10 or a remote user by means of a client device 4.

An external information system 30 that is separate from the provider server system 10 can maintain external target modules 31 that are referenced by the modules 1, 3 maintained within the provider server system 10. For example, an external server system 30 can be a server including legal texts maintained by a legal authority.

When one module 1, 3 references another one, the referencing one shall be called source module 1 and the reference one shall be called target module 3. The reference is expressed by a link 2 from the source module 1 to the target module 3. The link 2 is part of the module metadata 11 of the source module 1 and can be associated with a particular location in the module content 12 of the source module 1.

Displaying the link 2 in the source module 1 can involve, for example, displaying just a clickable description 23 of the link, acting like a hyperlink. Or it can involve displaying part of or all of the module content 312 of the target module 3 within the module content 12 of the source module 1. For example, the module content 312 of the target module 3 can be a paragraph of text, or an image, etc. which is displayed within a sequence of text that is part of the module content 12 of the source module 1. The source module 1 can include a plurality of links 2. The source module 1 can have the function of a table of contents, with the entire content that is displayed stemming from one or more target modules 3 referenced by the source module 1.

As a basis for controlling the methods for maintaining the system of virtual documents 5 and modules 1, 3, each link 2 is described by a number of link attributes:
- a source module ID 21, identifying a source module 1 in which the link 2 is referenced.
- a target module ID 22, identifying a target module 3 to which the link 2 refers.
  - optionally a target module document context 221 identifying a context in which to present the module content 312 of the target module 3. If this context is not set, this content 312 will be displayed its home document context. For this, the home document 5 is opened and displayed. If the context is set, the module content 312 is displayed in a context where it is re-used, for example in a manual or a summary document.
  - optionally a target module version 222. If the target module version 222 is set, then the corresponding module version must be used. If it is not set, the currently valid version of the module must be used.
- a description 23 of the link 2. This can be simply a description of the target module 3, or a description of the relation expressed by the link.
- an external ID 24, identifying an external target module 31 stored in an external server system 30, wherein the module content 312 of the target module 3 to which the link 2 refers the is a copy of an original module content of the external target module 31.
- a link type 25, specifying, among other information, triggering conditions and actions associated with the link.
- a link status 26, indicating at least an availability of the target module 3.
- a trigger dataset 27, representing a target module and version 271 to which the link 2 refers, and an effective to date 272 and effective from date 273 defining a time window in which this target module version is effective.
- a link owner 28, identifying a user or a role that is responsible for the link 2.

A link type 25 defines a set of attribute values associated with the link. It is of course possible to store these values directly as attributes of the link 2 itself, but in a structured approach, combinations of values that repeatedly occur are defined and each combination is associated with a link type 25.

Attributes defined via the link type 25 are:
- a link type description 251, for identifying the link type 25. See the table below for examples.
- a display option 252, specifying how to display the module content 312 of the target module 3. This can be, for example:
  Content: the module content 312 is displayed within the source module content.

Inline: the link 2, typically represented by its description 23, is displayed Inline within the source module content.

Reference: the link 2 is displayed in a reference section separated from the source module's content 12.

Hidden: the link 2 is displayed only within separately accessible link window showing all links grouped by link type a trigger type 253 and an associated trigger action 254, the trigger type 253 specifying an event causing a trigger to be activated, and the trigger action 254 specifying an action to be taken when the trigger is activated.

a source type 255, specifying a type of entity of the source module 1.

a target type 256, specifying a type of entity of the target module 3

In embodiments, the link attributes include an inactive status 29, representing whether the version of the source module 1 referred to by the source module ID 21 and the source module version 211 is effective at the current date. For example, the inactive status 29 is "false" if the current date lies between the module's effective from date 112 and its effective to date 111.

Depending on the actual implementation, not all link and type attributes presented above need to be present.

The following two tables show exemplary link types 25, their description and use case, and possible attribute combinations. A tenant includes documents, modules and links related to a common topic. For example, a tenant can be related to aviation, another one to road transportation safety, etc.

that the module has become effective (or valid) and that users reading the modules may have to be informed.

Exemplary trigger actions 254 are:

CR (Change Request): Add a Change Request to the linked source objects 1. A Change Request can then be used to trigger a workflow for editing and releasing new versions of the source modules 1.

Inform: Inform all users within a predefined set of user groups that the target module 3 has changed. For example, a notification is sent.

The change request typically refers to the source module 1 of the link 2. It is brought to the attention of a human user. If the user decides that the change in the target module 3 requires a change in the source module 1, she will modify the source module 1, which typically will involve setting a new module effective to date 111 and creating a new module version with a module effective from date 112. These changes will cause, according to the trigger mechanism described above, further triggers in links 2 pointing to the modified module, that is, in links 2 for which the module is the target module 3. In this way, changes propagate through the system.

In embodiments, changes are allowed only for modules 1, 3 for which a Change Request has been generated. This limits changes to the places where they are required, which benefits the efficiency and quality of the work involved in updating the system.

The trigger dataset 27 is used to calculate the trigger times depending on the link type. The trigger dataset 27 includes one or more datasets, each containing the following parameters:

| Type | Description, Use case |
|---|---|
| Inline | Inline link within content to a target module |
| InlineFix | Inline link within content to a fixe d target module version within the current tenant |
| Legal | Legal reference to a target module within the current tenant |
| FC | Link used within flashcard answer |
| User | User link |

| Type | Display option | Trigger | Trigger action | Source | Target |
|---|---|---|---|---|---|
| Inline | Inline | UponRunOut | Inform | Moduleversion | Module |
| InlineFix | Inline | UponRunOut | Inform | Moduleversion | Moduleversion |
| Legal | Reference | UponRunOut | CR | Module | Module |
| FC | — | UponEffective | Inform | Flashcard | Module |
| User | — | UponEffective | Inform | Module | Module |

The triggers shown are processed as follows: a batch process is executed at regular intervals, for example, once a day. It checks each link 2 for a possible trigger and if it is triggered, executes the trigger action. A trigger will be only executed if the source object is not inactive. A trigger can be executed only once, therefore the execution date is stored.

Exemplary trigger types 253 are:

UponRunOut: The trigger will be called, if the linked ModuleVersion gets a new Effective to date. This typically represents the situation that the end of the module's effectivity (or validity) is approaching, and that modules that reference it may have to be modified. This trigger can also be triggered during import of a module or when the module's metadata changes.

UponEffective: The trigger will be called, if the effective from date of the linked ModuleVersion corresponds to the actual day. This typically represents the situation the target module ID and version 271, which can be represented by a single object ID or OID, which uniquely identifies this version.

the effective to date 272, being the module effective to date 111 of the target module 3.

the effective from date 273, being the module effective from date 112 of the target module 3.

When the link is created, these parameters are dynamically determined, depending on the situation and the module version when the link 2 is created.

Determining if the UponRunOut trigger must be triggered is done as follows:

determine the target module and its version, represented for example by its OID.

Compare the effective to date 111 of this target module 3 version with the effective to date 272 stored in the trigger dataset 27, using the determined OID as key.

If the two module effective to dates do not match, the trigger must be fired.

If the trigger was fired, store the module effective to date 111 from the determined target module version in the trigger dataset 27 using the determined OID as key (representing the target module ID and version).

Determining if the UponEffective trigger must be triggered is done as follows:

Determine the target module and its version, represented for example by its OID.

If there exists a trigger dataset 27 whose target module ID and version 271 matches the determined target module version, and if the effective from date 273 in this trigger dataset 27 already does have a value, the trigger was fired already, and the process is terminated.

Otherwise, if no dataset is found for the target module and its version or the effective from date 273 in this trigger dataset 27 does not have a value, the trigger must be fired.

If the trigger was fired, store the module effective from date 112 from the determined target module version, and the determined target module version itself in a new entry in the trigger dataset 27.

Figure 3:
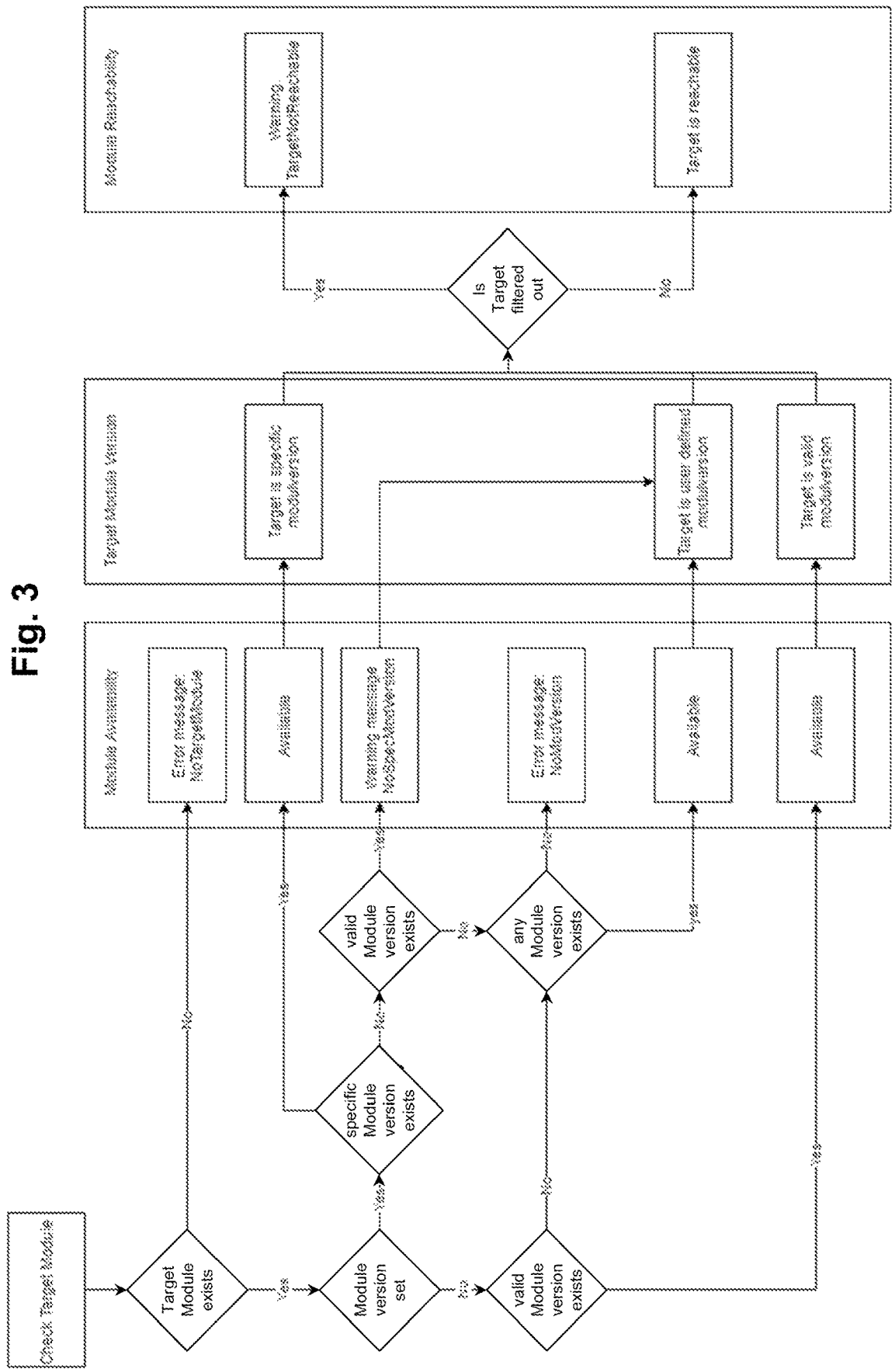
FIG. 3 a flow chart for determining a module availability.
Figure 4:
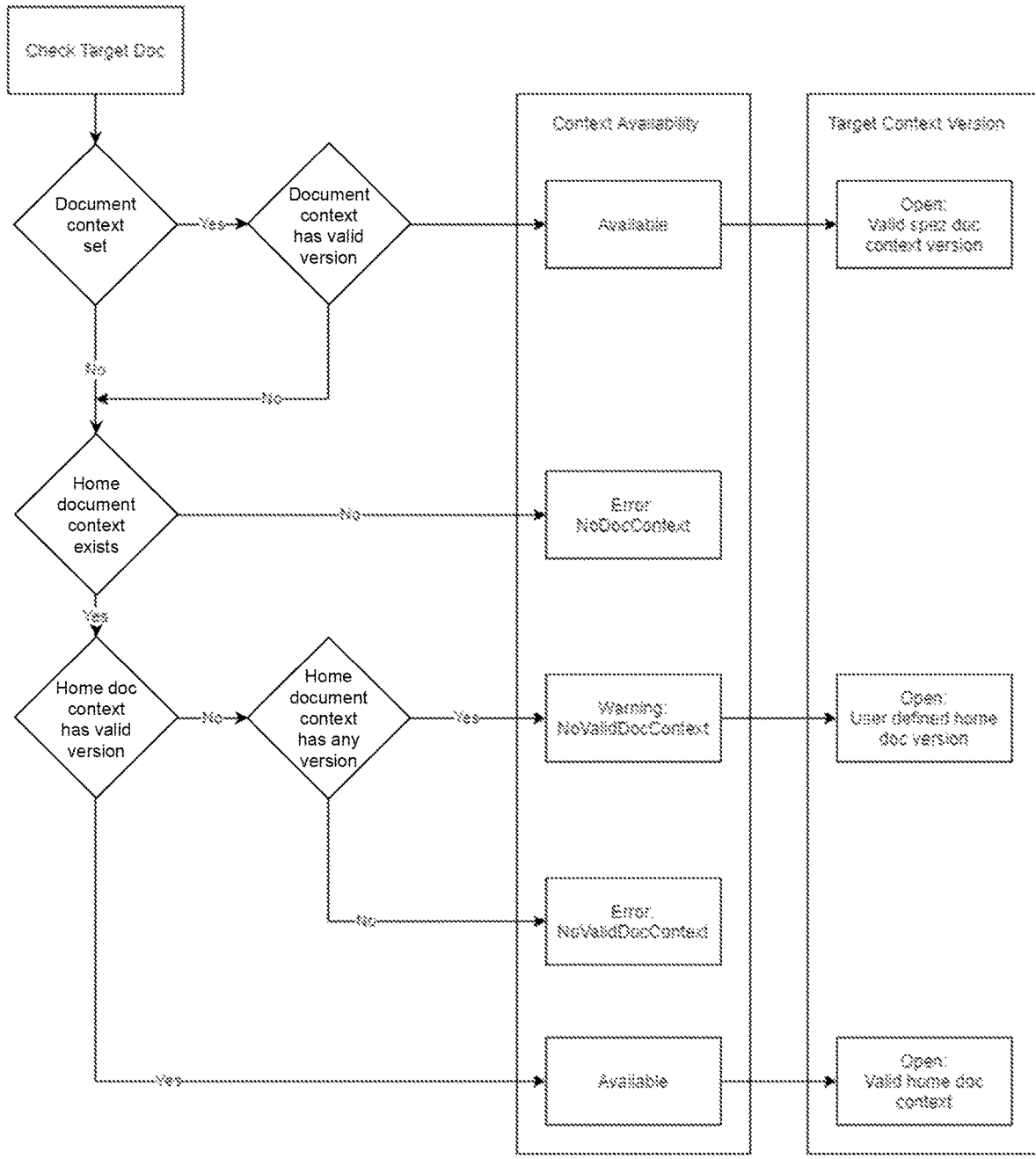
FIG. 4 a flow chart for determining a context availability and target context version.

The link status is dynamic, and part of it can be precalculated in a batch process, whereas another part can be determined when the link or its associated target module content 312 is displayed or called. The status represents different factors:

Used mandatory filters
Availability of content
Effectivity of context and module versions The status can be represented by availability and reachability. FIG. 3 shows a flow chart for determining a module availability and reachability. The part before the filtering (in the decision box "is target filtered out") can be performed in an (off-line) batch process, at a regular interval, the remaining part can be performed (on-line) when presenting the information.

Module availability determines if the module is available and if not returns availability messages:

Error: NoTargetModule: The target module is missing. This can be because it not physically reachable.

Warning: NoSpecModVersion: The specified module version is not available.

Warning: UserSpecModVersion: The required module version is not available, the user must select from a list of available versions Available: The target is available in the required version.

If a link 2 specifies a target module version 222, this determines which module version must be opened, when the link is called. This can be:

A specific module version.

User defined module version. This case requires a user interaction, in which, after the UserSpecModVersion availability warning the user can select a version of the module she wants to open.

Module reachability determines if the module is reachable using current filter settings. The result can be:

Target not reachable: the Target is available, but cannot be reached due to filter settings or access restrictions.

Target is reachable.

Context reachability determines the status of the context—for example, a home document 5—which is required to open the target module version. The result can be:

Error: NoDocContext: There is no document context for this module

Warning: NoValidDocContext: There is no valid document context, the user can select from a list of available document context versions.

Available.

A target context opening determines in which document context the target module version is opened. This can be:

A user defined home document version

A valid home document context version

FIG. 3 shows a flow chart for determining a context availability and target context version.

While the invention has been described in present embodiments, it is distinctly understood that the invention is not limited thereto, but may be otherwise variously embodied and practised within the scope of the claims.

The invention claimed is:

1. A method for information retrieval and presentation, performed by a computer-based data processing system, wherein units of information are represented by modules, each module comprising a module content and module metadata, the module content representing textual information and the module metadata controlling the retrieval and presentation of the module content, wherein:

relations between modules are represented by links, the links being associated with link attributes, and link attributes of each link comprising at least the following attributes:

a source module ID, identifying a source module in which the link is referenced;

a target module ID, identifying a target module to which the link refers;

optionally a target module document context identifying a context in which to present the module content of the target module;

optionally a target module version;

information defining a trigger type and an associated trigger action, the trigger type specifying an event causing a trigger to be activated, and the trigger action specifying an action to be taken when the trigger is activated;

a link status, indicating at least an availability of the target module;

a trigger dataset, representing a target module and version to which the link refers, and an effective to date and effective from date defining a time window in which this target module version is effective;

and wherein the method comprises the steps of determining, based on the trigger dataset, whether an event defined by the trigger type has occurred, and triggering the associated trigger action;

at regular time intervals, in a batch process, for each link, determining the availability of its target module and storing this availability as part of the link status;

and determining, if the target module is available, an available target module version and storing the target module version as an attribute of the link;

when a document comprising the link is presented to a user, determining, based the on availability of its target module and a user identity and/or filtering criteria, whether the link and/or module content of the target module is presented to the user.

2. The method of claim 1, wherein the trigger type specifies one of the following events the version of the target module to which the link refers getting a new module effective to date;

the module effective from date of the version of the target module to which the link refers being equal to the current date.

3. The method of claim 1, wherein a trigger action specifies one of
- informing a user about a change in the version of the target module to which the link refers, in particular wherein the user to be notified is identified by a predefined set of user groups associated with the link;
- initiating a change request associated with the source module in which the link is referenced.

4. The method of claim 1, wherein the availability of a target module is one of the following
- the target module is available;
- the target module is missing;
- a specified version of the target module is not available;

and optionally of the following
- a specified version of the target module is not available, and a user must select from a list of available versions.

5. The method of claim 1, wherein the link attributes comprise
- information defining display options, specifying how to display the module content of the target module, and a description of the link; an wherein the display options comprise one or more of
  - displaying the module content of the target module within the module content of the source module;
  - displaying the description, preferably as a hyperlink within the module content of the source module;
  - displaying the description in a reference section associated with the module content of the source module;
  - displaying the description only to users with associated privileges;

and wherein the method comprises the step of
- displaying the module content of the target module according to the information defining display options.

6. The method of claim 1, wherein the target module document context specifies whether to present the module content of the target module within a document as part of which the source module is being presented, or as part of a home document of which the target module is part; and wherein the method comprises the step of presenting the module content according to the target module document context.

7. The method of claim 1, wherein the link attributes of a link are stored as part of a data object representing the link.

8. A data processing system for information retrieval and presentation, comprising a provider server computer system, and optionally a client device, the data processing system being programmed to perform the method according to claim 1.

9. A non-transitory computer readable medium comprising computer readable program code encoding a computer program that, when loaded and executed on a computer, causes the computer to perform the method according to claim 1.

10. A method of manufacturing a non-transitory computer readable medium, comprising the step of storing, on the computer readable medium, computer-executable instructions which when executed by one or more processors of a computing system, cause the computing system to perform the method according to claim 1.

11. A method for information retrieval and presentation, performed by a computer-based data processing system, wherein units of information are represented by modules, each module comprising a module content and module metadata, the module content representing textual information and the module metadata controlling the retrieval and presentation of the module content, wherein:
relations between modules are represented by links, the links being associated with link attributes, and link attributes of each link comprising at least the following attributes:
- a source module ID, identifying a source module in which the link is referenced;
- a target module ID, identifying a target module to which the link refers;
  - optionally a target module document context identifying a context in which to present the module content of the target module;
  - optionally a target module version;
- information defining a trigger type and an associated trigger action, the trigger type specifying an event causing a trigger to be activated, and the trigger action specifying an action to be taken when the trigger is activated;
- a link status, indicating at least an availability of the target module;
- a trigger dataset, representing a target module and version to which the link refers, and an effective to date and effective from date defining a time window in which this target module version is effective;
- an external ID, identifying an external target module stored in an external server system, wherein the module content of the target module to which the link refers the is a copy of an original module content of the external target module;

and wherein the method comprises the steps of:
- determining, based on the trigger dataset, whether an event defined by the trigger type has occurred, and triggering the associated trigger action, and
- if content associated with the link is to be presented to the user, retrieving and presenting the original module content from the external target module, in particular in a context of the external target module.

12. A computer based data processing system for information retrieval and presentation,
wherein units of information are represented by modules, each module comprising a module content and module metadata, the module content representing textual information and the module metadata controlling the retrieval and presentation of the module content,
wherein
relations between modules are represented by links, links being associated with link attributes, and link attributes of each link comprising at least the following attributes:
- a source module ID, identifying a source module in which the link is referenced;
- a target module ID, identifying a target module to which the link refers;
  - optionally a target module document context identifying a context in which to present the module content of the target module;
  - optionally a target module version;
- information defining a trigger type and an associated trigger action, the trigger type specifying an event causing a trigger to be activated, and the trigger action specifying an action to be taken when the trigger is activated;
- a link status, indicating at least an availability of the target module;
- a trigger dataset, representing a target module and version to which the link refers, and an effective to date and effective from date defining a time window in which this target module version is effective;

and wherein the computer based data processing system is configured to:
- determine, based on the trigger dataset, whether an event defined by the trigger type has occurred, and triggering the associated trigger action;
- at regular time intervals, in a batch process, for each link, to determine the availability of its target module and storing this availability as part of the link status;
- and to determine, if the target module is available, an available target module version and storing the target module version as an attribute of the link;

when a document comprising the link is presented to a user, to determine, based the on availability of its target module and a user identity and/or filtering criteria, whether the link and/or module content of the target module is presented to the user.

13. A computer based data processing system for information retrieval and presentation,
wherein units of information are represented by modules, each module comprising a module content and module metadata, the module content representing textual information and the module metadata controlling the retrieval and presentation of the module content,
wherein
relations between modules are represented by links, links being associated with link attributes, and link attributes of each link comprising at least the following attributes:
- a source module ID, identifying a source module in which the link is referenced;
- a target module ID, identifying a target module to which the link refers;
- optionally a target module document context identifying a context in which to present the module content of the target module;
- optionally a target module version;
- information defining a trigger type and an associated trigger action, the trigger type specifying an event causing a trigger to be activated, and the trigger action specifying an action to be taken when the trigger is activated;
- a link status, indicating at least an availability of the target module;
- a trigger dataset, representing a target module and version to which the link refers, and an effective to date and effective from date defining a time window in which this target module version is effective;
- an external ID, identifying an external target module stored in an external server system, wherein the module content of the target module to which the link refers the is a copy of an original module content of the external target module;

and wherein the computer based data processing system is configured to determine, based on the trigger dataset, whether an event defined by the trigger type has occurred, and triggering the associated trigger action;
if content associated with the link is to be presented to the user, to retrieve and present the original module content from the external target module, in particular in a context of the external target module.

* * * * *